US009077458B2

(12) United States Patent
Burger et al.

(10) Patent No.: US 9,077,458 B2
(45) Date of Patent: Jul. 7, 2015

(54) SELECTION OF ADVERTISEMENTS VIA VIEWER FEEDBACK

(75) Inventors: Doug Burger, Bellevue, WA (US); Todd Eric Holmdahl, Redmond, WA (US); Joseph H. Matthews, III, Woodinville, WA (US); James A. Baldwin, Palo Alto, CA (US); Jay Schiller, Medina, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/163,536

(22) Filed: Jun. 17, 2011

(65) Prior Publication Data

US 2012/0324494 A1 Dec. 20, 2012

(51) Int. Cl.
*H04H 20/10* (2008.01)
*H04N 21/262* (2011.01)
(Continued)

(52) U.S. Cl.
CPC ....... *H04H 20/103* (2013.01); *H04N 21/26241* (2013.01); *H04N 21/44213* (2013.01); *H04N 21/44236* (2013.01); *H04N 21/23424* (2013.01);
(Continued)

(58) Field of Classification Search
CPC .................... H04N 21/26241; H04N 21/4316; H04N 21/4331; H04N 21/488; H04N 21/812; H04N 21/23424
USPC .......................................................... 725/12
See application file for complete search history.

(56) References Cited

U.S. PATENT DOCUMENTS

| 4,931,865 A | 6/1990 | Scarampi |
| 5,319,455 A | 6/1994 | Hoarty et al. |

(Continued)

FOREIGN PATENT DOCUMENTS

| EP | 2136329 A2 | 12/2009 |
| EP | 2141836 A2 | 1/2010 |

(Continued)

OTHER PUBLICATIONS

"How Viewers Engage With Television", Retrieved at <<http://www.thinkbox.tv/server/show/nav.854>>, Retrieved Date: Mar. 10, 2011, p. 1.

(Continued)

*Primary Examiner* — Justin Shepard
(74) *Attorney, Agent, or Firm* — Nicholas Chen; Kate Drakos; Micky Minhas

(57) ABSTRACT

Embodiments related to selecting advertisements for display to targeted viewers are disclosed. In one example embodiment, an advertisement is selected by, for each of a plurality of advertisements, aggregating a plurality of emotional response profiles from a corresponding plurality of prior viewers of the advertisement to form an aggregated emotional response profile for the advertisement, wherein each of the emotional response profiles comprises a temporal record of a prior viewer's emotional response to the advertisement. The method further includes identifying a group of potentially positively correlated viewers for the targeted viewer, filtering the aggregated emotional response profiles based on the group of potentially positively correlated viewers, selecting a particular advertisement from the plurality of advertisements based on a correlation of the filtered aggregated emotional response profiles, and sending the particular advertisement for display to the targeted viewer.

19 Claims, 5 Drawing Sheets

(51) Int. Cl.

| | |
|---|---|
| *H04N 21/442* | (2011.01) |
| *H04N 21/234* | (2011.01) |
| *H04H 60/33* | (2008.01) |
| *H04N 21/258* | (2011.01) |
| *H04N 21/2668* | (2011.01) |
| *H04N 21/458* | (2011.01) |
| *H04N 21/475* | (2011.01) |
| *H04N 21/25* | (2011.01) |
| *H04N 21/422* | (2011.01) |
| *H04N 21/81* | (2011.01) |
| *H04H 60/45* | (2008.01) |

(52) U.S. Cl.
 CPC ......... *H04N 21/44222* (2013.01); *H04H 60/33* (2013.01); *H04H 60/45* (2013.01); *H04N 21/25891* (2013.01); *H04N 21/2668* (2013.01); *H04N 21/458* (2013.01); *H04N 21/4756* (2013.01); *H04N 21/252* (2013.01); *H04N 21/42201* (2013.01); *H04N 21/44218* (2013.01); *H04N 21/812* (2013.01)

(56) References Cited

U.S. PATENT DOCUMENTS

| | | |
|---|---|---|
| 7,023,499 B2 | 4/2006 | Williams et al. |
| 7,260,823 B2 | 8/2007 | Schlack et al. |
| 7,370,342 B2 | 5/2008 | Ismail et al. |
| 7,631,327 B2 | 12/2009 | Dempski et al. |
| 7,698,302 B2 | 4/2010 | Wendelrup |
| 7,870,577 B2 * | 1/2011 | Haberman et al. ............. 725/35 |
| 8,667,549 B2 * | 3/2014 | Reneris .......................... 725/121 |
| 2003/0101451 A1 * | 5/2003 | Bentolila et al. ................ 725/34 |
| 2005/0071865 A1 | 3/2005 | Martins |
| 2005/0120391 A1 | 6/2005 | Haynie et al. |
| 2005/0132420 A1 | 6/2005 | Howard et al. |
| 2007/0150916 A1 | 6/2007 | Begole et al. |
| 2008/0086742 A1 | 4/2008 | Aldrey et al. |
| 2008/0133638 A1 | 6/2008 | Fischer et al. |
| 2008/0147488 A1 | 6/2008 | Tunick et al. |
| 2008/0244655 A1 | 10/2008 | Mattila et al. |
| 2009/0113480 A1 | 4/2009 | Allard et al. |
| 2009/0119151 A1 | 5/2009 | de Heer |
| 2009/0177528 A1 | 7/2009 | Wu et al. |
| 2009/0195392 A1 | 8/2009 | Zalewski |
| 2009/0210902 A1 | 8/2009 | Slaney et al. |
| 2009/0217315 A1 | 8/2009 | Malik et al. |
| 2009/0217324 A1 | 8/2009 | Massimi |
| 2009/0293079 A1 | 11/2009 | McKee et al. |
| 2010/0017287 A1 | 1/2010 | Caldwell et al. |
| 2010/0017820 A1 * | 1/2010 | Thevathasan et al. .......... 725/35 |
| 2010/0037277 A1 | 2/2010 | Flynn-Ripley et al. |
| 2010/0070987 A1 | 3/2010 | Amento et al. |
| 2010/0086204 A1 | 4/2010 | Lessing |
| 2010/0150530 A1 | 6/2010 | Zalewski |
| 2010/0211439 A1 | 8/2010 | Marci et al. |
| 2010/0293565 A1 | 11/2010 | Rantalainen |
| 2011/0154385 A1 * | 6/2011 | Price et al. ....................... 725/12 |
| 2011/0219403 A1 * | 9/2011 | Nesamoney et al. ........... 725/34 |
| 2012/0072939 A1 * | 3/2012 | Crenshaw ....................... 725/12 |
| 2012/0084809 A1 * | 4/2012 | Schultz ........................... 725/34 |

FOREIGN PATENT DOCUMENTS

| | | |
|---|---|---|
| JP | 2008170820 A | 7/2008 |
| KR | 20110047661 A | 5/2011 |
| WO | 00/54201 A2 | 9/2000 |

OTHER PUBLICATIONS

"Real-Time Television Content Platform", Retrieved at <<http://www.accenture.com/us-en/pages/insight-real-time-television-platform.aspx>>, May 28, 2002, pp. 3.

Wong, George, "TV Video Sensor Used to Provide Selective Advertising", Retrieved at <<http://www.ubergizmo.com/2011/03/tv-video-sensor-selective-advedising/>>, Mar. 2, 2011, pp. 3.

Smith, Tony, "Toshiba Previews TV UI for Cloud Content", Retrieved at <<http://www.reghardware.com/2011/02/15/toshiba_previews_places/>>, Feb. 15, 2011, pp. 3.

Vidyarthi, Neil, "Report: Facebook and Twitter Battle for Social TV Ad Space", Retrieved at <<http://www.socialtimes.com/2010/07/report-facebook-and-twitter-battle-for-social-tv-ad-space/>>, Jul. 6, 2010, pp. 5.

Kastelein, Richard,"Social TV: How Facebook, Twitter and Connected TV Will Transform the TV Market", Retrieved at <<http://www.appmarket.tv/news/160-breaking-news/455-social-tv-how-facebook-twitter-and-connected-tv-will-transform-the-tv-market.html>>, Jul. 4, 2010, pp. 4.

Lekakos, et al., "An Integrated Approach to Interactive and Personalized TV Advertising", Retrieved at <<http://citeseerx.ist.psu.edu/viewdoc/download?doi=10.1.1.129.2265&rep=rep1&type=pdf>>, In Workshop on Personalization in Future TV, 2001, pp. 1-10.

"Social Media Meets Online Television: Social TV Brings Television 2.0 to Your TV Set", Retrieved at <<http://www.masternewmedia.org/social-media-meets-online-television-social-tv-brings-television-20-to-your-tv-set/>>, Jan. 27, 2010, pp. 15.

Harrison, et al., "CollaboraTV—Making TV Social Again", Retrieved at <<https://soc.kuleuven.be/com/mediac/socialitv/CollaboraTV%20-%20Making%20TV%20Social%20Again.pdf>>, Retrieved Date: Mar. 14, 2011, pp. 2.

"International Search Report" mailed Feb. 20, 2013 for Application No. PCT/US2012/042701, Filed Date: Jun. 15, 2012, pp. 9.

European Patent Office, Supplementary European Search Report Issued in European Patent Application No. 12801349.7, Oct. 16, 2014, 9 pages.

European Patent Office, Office Action Issued in European Patent Application No. 12801349.7, Nov. 4, 2014, 1 page.

* cited by examiner

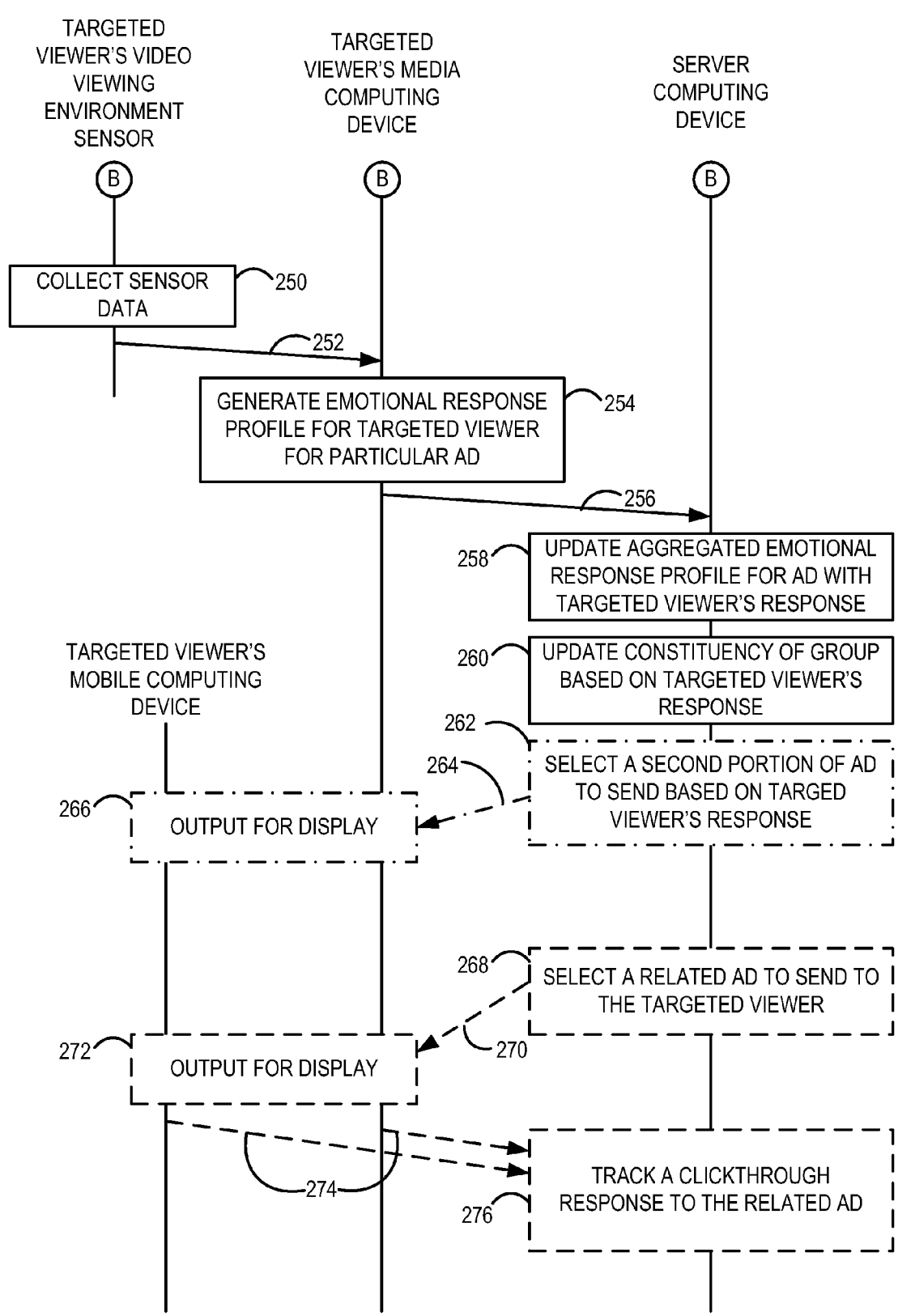

SELECTION OF ADVERTISEMENTS VIA VIEWER FEEDBACK

BACKGROUND

Identifying engaging advertisements for inclusion with video media may present difficulties. For example, because the potential audience size for an advertisement may be large, selection of advertisements within a larger advertising campaign is often based on the interests of a broad focus group for the campaign. As a consequence, the underlying concept for the campaign may not reflect the tastes and interests of narrower sub-groups of viewers.

SUMMARY

Embodiments related to selecting advertisements for display to targeted viewers are provided. In one embodiment, an advertisement is provided by aggregating, for each of a plurality of advertisements, a plurality of emotional response profiles received from a corresponding plurality of prior viewers of the advertisement to form an aggregated emotional response profile for the advertisement, wherein each of the emotional response profiles comprises a temporal record of a prior viewer's emotional response to the advertisement. The embodiment further comprises identifying a group of potentially positively correlated viewers for the targeted viewer, filtering the aggregated emotional response profiles based on the group of potentially positively correlated viewers, selecting a particular advertisement from the plurality of advertisements based on the filtered aggregated emotional response profiles, and sending the particular advertisement for display to the targeted viewer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-C show a flow diagram depicting a method of selecting an advertisement for display to a targeted viewer according to an embodiment of the present disclosure.

DETAILED DESCRIPTION

Selecting effective advertisements for delivery with video media to viewers may pose difficulties. Selection of ad concepts, themes, and styles may be central to developing brand affinity with a consumer, but may also be subject to the tastes and interests of the consumer. Thus, individual advertising campaigns are developed around a particular demographic based on sample market research. Because the selection of advertisements to accompany video content items delivered to a targeted viewer may rely on the assumptions of the sample group, customization on a per-viewer basis may be difficult to achieve.

Thus, the disclosed embodiments relate to the selection and presentation of advertisements that may be of particular interest to a targeted viewer based on the emotional responses of groups of viewers with interests and consuming behaviors that are potentially positively correlated with the targeted viewer, as well as on the targeted viewer's own current and past emotional responses. Because brands recommended by people included in the targeted viewer's social networks may include goods and services that the targeted viewer is inclined to trust, selecting advertisements based in part on the targeted viewer's social network may comparatively enhance the efficacy of ad personalization. Further, because members of a social network may potentially share interests and personality traits with the targeted viewer, the targeted viewer may potentially respond to advertisements in a manner positively correlated with the other members of the targeted viewer's social network(s).

The embodiments may utilize viewing environment sensors, such as image sensors, depth sensors, acoustic sensors, and potentially other sensors such as motion and biometric sensors, to assist in determining viewer preferences for use in identifying such advertisements. Such sensors may allow systems to identify individuals, detect and understand human emotional expressions, and provide real-time feedback while a viewer is watching video. Based on such feedback, an entertainment system may determine a measure of a viewer's enjoyment of the advertisement, and provide real-time responses to the perceived viewer emotional responses. Thus, the detection of human emotional expressions may be particularly useful for learning viewer preferences and personalizing advertising content. Further, emotional responses of viewers to advertisements may be aggregated and fed to advertisement creators. For example, advertisement creators may receive information on campaigns and concepts that inspired viewer engagement with a brand, ads that inspired strong emotional reactions, and aspects of ads that inspired brand affinity by the viewer.

Figure 1:
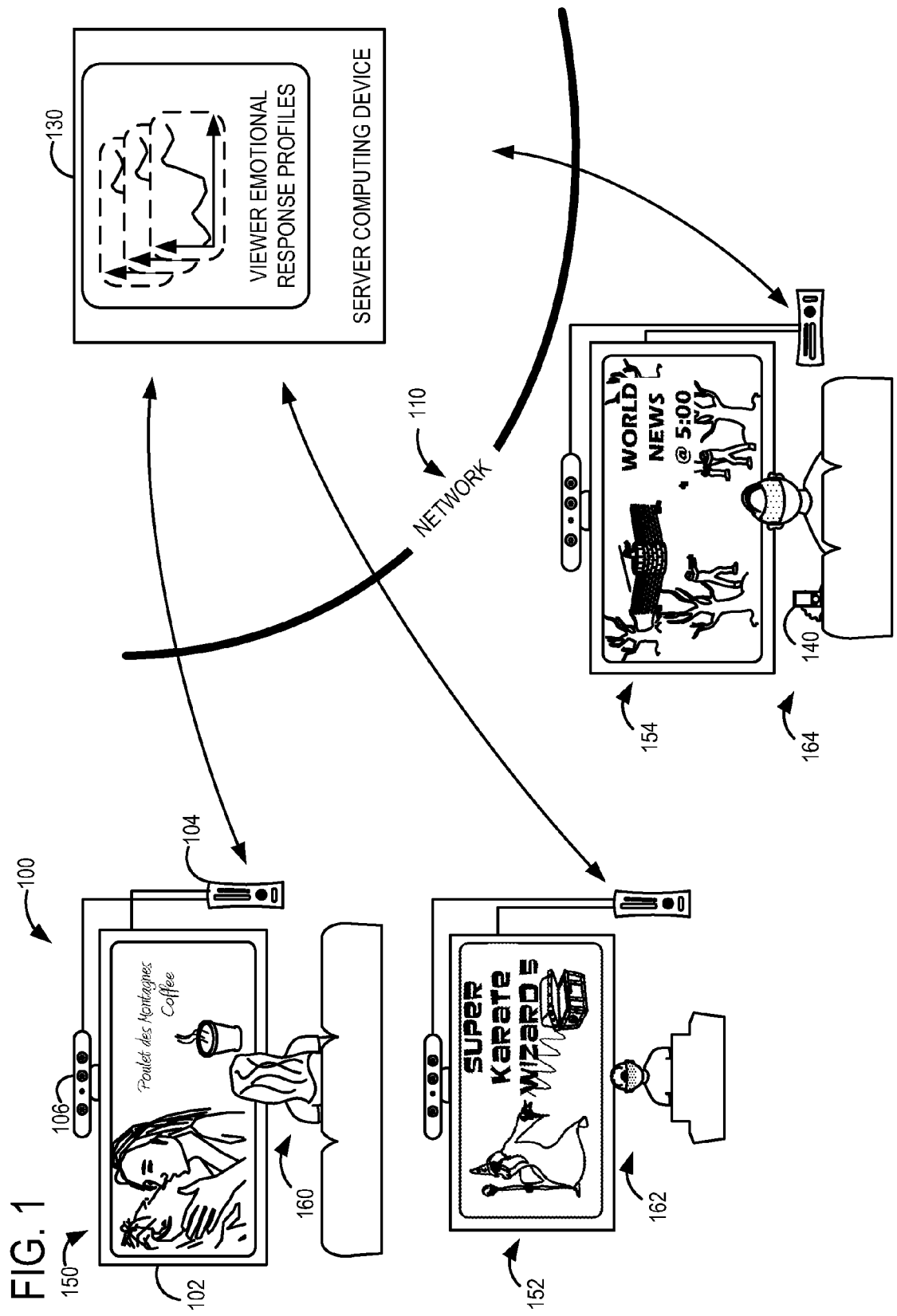
FIG. 1 schematically shows viewers watching advertisements within video viewing environments according to an embodiment of the present disclosure.

FIG. 1 schematically shows an embodiment of an advertising presentation environment 100 in which advertisements are displayed on displays such as display device 102. Display of the advertisements may be controlled by computing devices, such as media computing device 104, or may be controlled in any other suitable manner. The media computing device 104 may comprise a game console, a set-top box, a desktop computer, laptop computer, notepad computer, or any other suitable computing device.

Viewers are shown in FIG. 1 at 160, 162, and 164 watching advertisements 150, 152, and 154, respectively. A video viewing environment sensor system, such as that shown at 106, is connected to each media computing device to provide sensor data to the media computing device. The media computing devices may then generate viewer emotional response profiles that each represents a temporal emotional response to advertisement viewed by a viewer.

In turn, emotional response profiles of the viewers for the advertisements are sent to a server computing device 130 via network 110, where, for each of the advertisements, the emotional response profiles from a plurality of viewers are synthesized into an aggregated emotional response profile for that advertisement. Later, a particular advertisement may be selected for display to a targeted viewer based on the aggregated emotional response profiles as filtered by a group of people socially and/or demographically related to the targeted viewer. For example, an advertisement may be selected based on an intensity or magnitude of an emotional response of the group to the advertisement, and/or to aspects of portions of the advertisement (e.g. objects, scenes, etc. in the advertisement). Further, an advertisement may be selected based on a current emotional status of the targeted viewer and/or an advertising interests profile for the targeted viewer. By tailoring advertisement selection to the targeted viewer, it may be comparatively more likely that the targeted viewer will find the advertisement interesting and emotionally stimulating, which may enhance the effectiveness of the advertisement.

Video viewing environment sensor system 106 may include any suitable sensors, including but not limited to one or more image sensors, depth sensors, and/or microphones or other acoustic sensors. Data from such sensors may be used by computing device 104 to detect postures and gestures of a viewer, which may be correlated by media computing device 104 to human affect displays. It will be understood that the term "human affect displays" as used herein may represent any detectable human response to content being viewed, including but not limited to human emotional expressions and/or detectable displays of human emotional behaviors, such as facial, gestural, and vocal displays, whether performed consciously or subconsciously.

Media computing device 104 may process data received from sensor system 106 to generate temporal relationships between advertisements viewed by viewers and each viewer's emotional response to the advertisement. As explained in more detail below, such relationships may be recorded as a viewer's emotional response profile for a particular advertisement and included in an advertising interest profile cataloging the viewer's advertising interests. This may allow the advertising interest profile for a targeted viewer and/or for a person or people in a group of potentially positively correlated viewers (e.g. that may be likely to respond to an advertisement in a similar manner as a targeted viewer as determined by a common interest, social relationship, or other link between the viewers), to be retrieved and used to select advertising content.

As a more specific example, image data received from viewing environment sensor system 106 may capture conscious displays of human emotional behavior of a viewer, such as an image of a viewer 160 cringing or covering his face. In response, the viewer's emotional response profile for that advertisement may indicate that the viewer was scared at that time during the advertisement. The image data may also include subconscious displays of human emotional states. In such a scenario, image data may show that a user was looking away from the display at a particular time during an advertisement. In response, the viewer's emotional response profile for that advertisement may indicate that she was bored or distracted at that time. Eye-tracking, facial posture characterization and other suitable techniques may also be employed to gauge a viewer's degree of emotional stimulation and engagement with advertisement 150.

In some embodiments, an image sensor may collect light within a spectral region that is diagnostic of human physiological conditions. For example, infrared light may be used to approximate blood oxygen levels and/or heart rate levels within the body; in turn, such levels may be used to estimate the person's emotional stimulation.

Further, in some embodiments, sensors that reside in other devices than viewing environment sensor system 106 may be used to provide input to media computing device 104. For example, in some embodiments, an accelerometer included in a mobile computing device (e.g., mobile phone, laptop computer, tablet computer, etc.) held by a viewer 160 within video viewing environment 100 may detect gesture-based emotional expressions for that viewer.

Figure 2A:
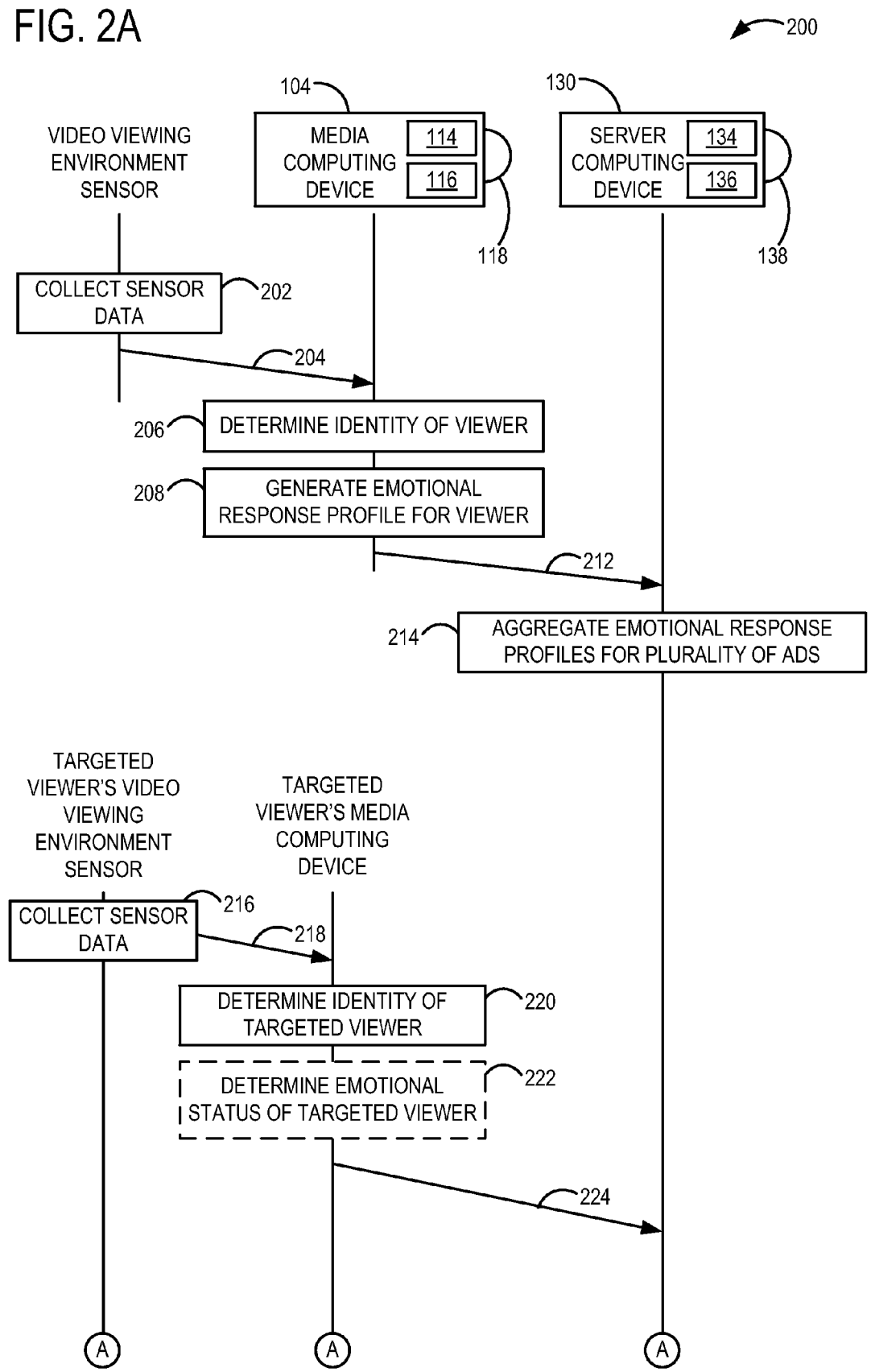
Figure 2B:
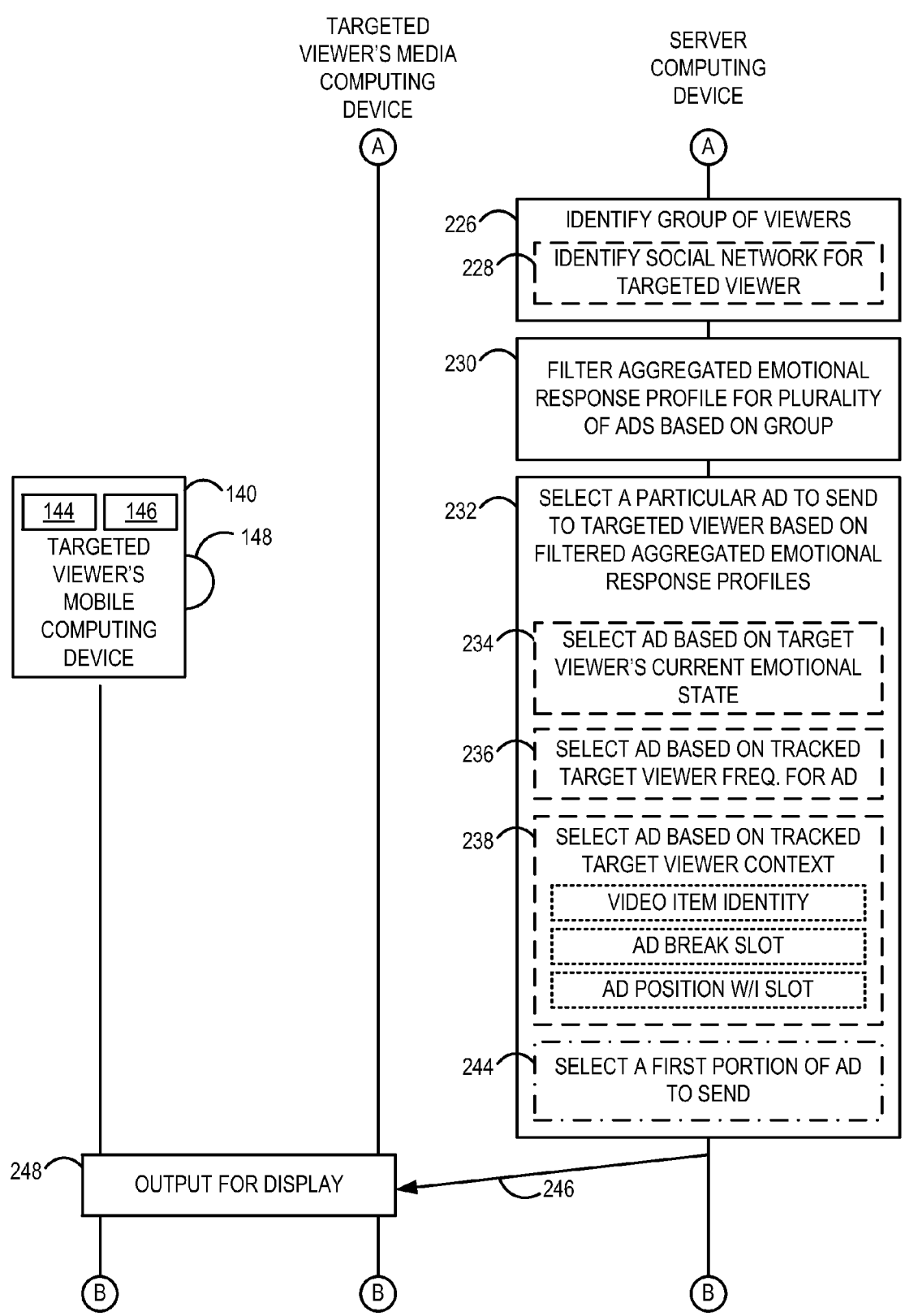

FIGS. 2A-C show a flow diagram depicting an embodiment of a method 200 for selecting an advertisement for display to a targeted viewer. It will be appreciated that method 200 may be performed by any suitable hardware, including but not limited to embodiments of the hardware referenced in FIG. 1 and elsewhere within this disclosure. FIG. 2A depicts media computing device 104 as including a data-holding subsystem 114 that holds instructions executable by a logic subsystem 116 to perform the embodiments disclosed herein. Computing device 104 also may include removable and/or non-removable computer storage media 118 that stores executable instructions. Similarly, server computing device 130 is depicted as including a data-holding subsystem 134, a logic subsystem 136, and removable and/or non-removable computer storage media 138.

As mentioned above, in some embodiments, sensor data from sensors on a viewer's mobile device may be provided to the media computing device. Further, supplemental/related advertisement content related to an advertisement being watched may be provided to the targeted viewer's mobile device. Thus, in some embodiments, a mobile computing device 140 registered with media computing device 104 and/or server computing device 130 may perform such functions. FIG. 2B depicts mobile computing device 140 as including a data-holding subsystem 144, a logic subsystem 146, and removable computer storage media 148. Aspects of such data-holding subsystems, logic subsystems, and removable computer storage media as referenced herein are described in more detail below.

Returning to FIG. 2A, at 202, method 200 includes collecting sensor data at the video viewing environment sensor and potentially from mobile computing device 140, and at 204, sending the sensor data to the media computing device, which receives the input of sensor data. Any suitable sensor data may be collected, including but not limited to image sensor data, depth sensor data, acoustic sensor data, biometric sensor data, etc.

At 206, method 200 includes determining an identity of a viewer in the video viewing environment from the input of sensor data. In some embodiments, the viewer's identity may be established from a comparison of image data collected by the sensor data with image data stored in the viewer's personal profile. For example, a facial similarity comparison between a face included in image data collected from the video viewing environment and an image stored in the viewer's profile may be used to establish the identity of that viewer. A viewers' identity also may be determined from acoustic data, or any other suitable data. Likewise, a viewer identity may be entered manually by a user (e.g. by voice, text entry device, etc.).

In some embodiments, the viewer may elect to participate by opting-in. For example, in exchange for providing the various information described herein (including emotional response information), the viewer may receive various offers, enhanced advertisement and/or entertainment content, and similar incentives that may enrich the viewer's entertainment experience.

At 208, method 200 includes generating an emotional response profile for the viewer, the emotional response profile comprising a temporal record of the viewer's emotional response to the advertisement being displayed in the video viewing environment. Put another way, the viewer's emotional response profile for the advertisement indexes that viewer's emotional expressions and behavioral displays as a function of a time position within the advertisement.

Figure 3:
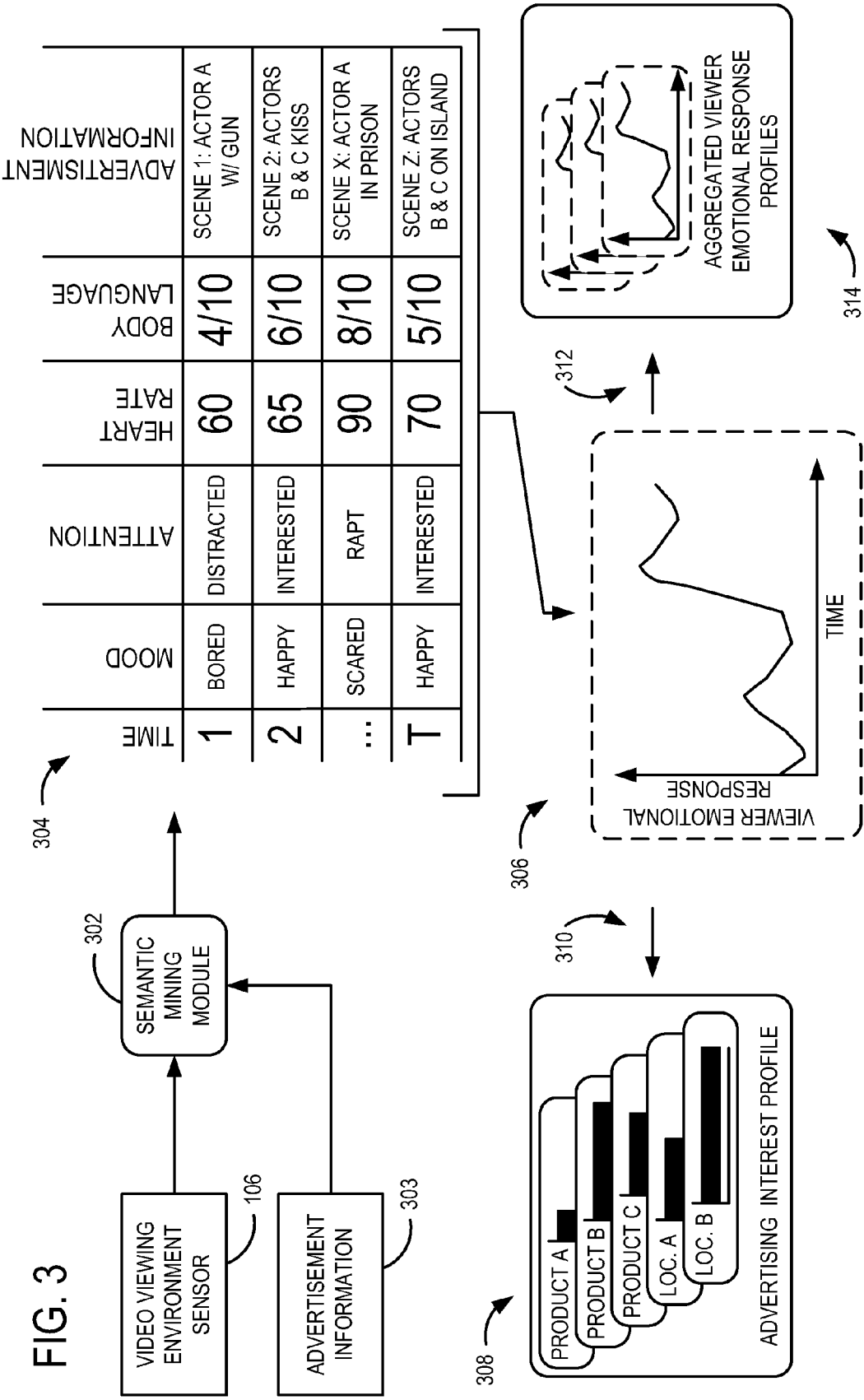
FIG. 3 schematically shows a viewer emotional response profile, a viewing interest profile, and an aggregated viewer emotional response profile according to an embodiment of the present disclosure.

FIG. 3 schematically shows an embodiment of a viewer emotional response profile 304. As shown in FIG. 3, viewer emotional response profile 304 is generated by a semantic mining module 302 running on one or more of media computing device 104 and server computing device 130 using sensor information received from one or more video viewing environment sensors. Using emotional response data from the sensor and also advertisement information 303 (e.g., metadata identifying a particular advertisement the viewer was watching when the emotional response data was collected and where in the advertisement the emotional response occurred), semantic mining module 302 generates viewer emotional response profile 304, which captures the viewer's emotional response as a function the time position within the advertisement.

In the example shown in FIG. 3, semantic mining module 302 assigns emotional identifications to various behavioral and other expression data (e.g., physiological data) detected by the video viewing environment sensors. Semantic mining module 302 also indexes the viewer's emotional expression according to a time sequence synchronized with the advertisement, for example, by times for various events, scenes, and actions occurring within the advertisement. Thus, in the example shown in FIG. 3, at time index 1 of an advertisement, semantic mining module 302 records that the viewer was bored and distracted based on physiological data (e.g., heart rate data) and human affect display data (e.g., a body language score). At later time index 2, viewer emotional response profile 304 indicates that the viewer was happy and interested in the advertisement, while at time index 3 the viewer was scared but her attention was raptly focused on the advertisement.

In some embodiments, emotional response profile 302 may include a record of the viewer's attentiveness to an advertisement. So recorded, various entities in the video content delivery chain (e.g., video content creators and providers, advertising content creators and providers, etc.) may reference the viewer's attentiveness individually, or in combination with attentiveness evaluations for a plurality of other viewers, as feedback on the advertisement's efficacy.

In some embodiments, the viewer's attentiveness may be used to alter a payout value for the advertisement between two or more of such entities. For example, if the attentiveness for a first viewer to a particular advertisement, as recorded in that viewer's emotional response profile 302 for the advertisement, is relatively higher than that of a second viewer for the same advertisement, a payout from an advertiser to a video content provider and/or an advertising content creator may be higher in the first instance relative to the second instance. Consequently, a price for the advertising impression may be determined using feedback derived from the viewer's emotional response to an advertisement, but without asking for feedback from the viewer. Further, because the price of an advertising impression for a particular viewer may be determined relative to the price determined based on other viewers' responses to the advertisement, the value of the advertising impression may be determined more efficiently relative to existing models that exclude attentiveness from valuation.

In some embodiments, semantic mining module 302 may be configured to distinguish between the viewer's emotional response to an advertisement and the viewer's general temper. For example, in some embodiments, semantic mining module 302 may ignore (or may report that the viewer is distracted during) those human affective displays detected when the viewer's attention is not focused on the display device. Thus, as an example scenario, if the viewer is visibly annoyed because of a loud noise originating external to the video viewing environment, semantic mining module 302 may be configured not to ascribe the detected annoyance with the advertisement, and may not record the annoyance at that temporal position within the viewer's emotional response profile for the advertisement. In embodiments in which an image sensor is included as a video viewing environment sensor, suitable eye tracking and/or face position tracking techniques may be employed (potentially in combination with a depth map of the video viewing environment) to determine a degree to which the viewer's attention is focused on the display device and/or the advertisement. FIG. 3 also shows an emotional response profile 304 for an advertisement in graphical form at 306. The emotional response profile may be displayed in such form, for example, to an advertiser seeking to understand viewers' reactions to advertisements.

A viewer's emotional response profile 304 for an advertisement may be analyzed to determine the types of scenes/objects/occurrences that evoked positive and negative responses in the viewer. For example, in the example shown in FIG. 3, advertisement information, including scene descriptions, are correlated with sensor data and the viewer's emotional responses. The results of such analysis may then be collected in an advertisement interest profile 308. Advertisement interest profile 308 catalogs a viewer's likes and dislikes for advertisements, as judged from the viewer's emotional responses to past media experiences. Advertisement interest profiles may be generated from a plurality of emotional response profiles, wherein objects, settings and other images depicted in the advertisement are linked to detected emotional states. As the viewer watches more advertisements, the viewer's advertisement interest profile may be altered to reflect changing tastes and interests of the viewer as expressed in the viewer's emotional responses to recently viewed advertisements.

Further, the viewer's advertisement interest profile may include information about the viewer's personal interests (e.g., hobbies), viewing interests (e.g., video viewing histories and preferences), Internet browsing interests, and varying degrees of demographic information for the viewer (e.g., age, gender, location, occupation, etc.).

By performing such analysis for other advertisements viewed by the viewer, as shown at 310 of FIG. 3, and then determining similarities between portions of different content items that evoked similar emotional responses, potential likes and dislikes of a viewer may be determined and used to locate advertisement suggestions for future viewing. For example, FIG. 3 shows that the viewer prefers product B to products A and C and prefers location type B over location type A.

Turning back to FIG. 2A, method 200 includes, at 212, receiving, for a plurality of advertisements, emotional response profiles from each of a plurality of viewers. Once received, the emotional responses may be analyzed and/or stored for later analysis, as described below.

At 214, method 200 includes aggregating a plurality of emotional response profiles for the advertisements to form an aggregated emotional response profiles for those advertisements. For example, FIG. 3 shows an embodiment of an aggregated emotional response profile 314 for an advertisement. As shown in 312 of FIG. 3, a plurality of emotional response profiles for an advertisement, each profile originating from a different viewer, may be averaged or otherwise combined to generate aggregated emotional response profile 314. Additionally, in some embodiments, aggregated emotional response profile 314 may also be associated with advertisement information in any suitable way (e.g., by product type; by brand; by advertisement theme, style, and length; etc.) to identify characteristics about the advertisement that triggered, to varying degrees and enjoyment levels, emotional experiences for the plurality of viewers.

Further, in some embodiments, aggregated emotional response profile 314 may be presented graphically (e.g., as a histogram or as a heatmap) depicting the relative degree and/or type of emotional stimulation as a function of time position within the advertisement. Such graphical depictions may help advertisement content creators identify emotionally stimulating and/or interesting portions of an advertisement for a group of viewers at any suitable level of granularity (e.g., by filtering the emotional responses by social, demographic, and other suitable criteria). In this manner, emotional responses for a broad group of viewers to an advertisement may be sorted and filtered to identify emotionally significant aspects of the advertisement for narrower sub-groups of viewers.

In some embodiments, a particular advertisement may be further selected based on the emotional status of a viewer for whom that advertisement is targeted (e.g., a "targeted viewer"). Thus, returning to FIG. 2A, method 200 includes, at 216, collecting sensor data of the targeted viewer's emotional state from a video viewing environment sensor, and at 218, sending the sensor data to a media computing device, where it is received. In the example shown in FIG. 2A, sensor data collection occurs at the targeted viewer's video viewing environment sensor and is sent to the targeted viewer's media computing device. However, it will be appreciated that this example is not limiting, and that any suitable video viewing environment sensor may collect data of the targeted viewer's human affect displays and transmit it to any suitable computing device (e.g., a media computing device and/or a server computing device) for processing.

At 220, method 200 includes determining an identity of the targeted viewer. This may allow an advertising interest profile for the targeted viewer to be accessed to aid in advertising selection. It will be appreciated that the requesting viewer's identity may be detected in any suitable way, including but not limited to the methods described above.

Further, at 222, method 200 may include determining an emotional status of the targeted viewer from the sensor data received. By determining the targeted viewer's current emotional status, an advertisement may be selected that complements the targeted viewer's mood, potentially leading the targeted viewer to engage with and respond to the selected advertisement. The targeted viewer's emotional status may be determined in any suitable way, including but not limited to the semantic mining schemes mentioned above. At 224, the targeted viewer's identity and, if determined, emotional status, is sent to a server computing device for further processing.

Turning to FIG. 2B, method 200 includes, at 226, identifying a group of potentially positively correlated viewers for the targeted viewer. As described above, brands recommended by people socially linked with and/or demographically similar to with the targeted viewer may include brands that the targeted viewer is inclined to trust. Accordingly, analyzing emotional responses of people that are associated socially with the targeted viewer to various advertisements may indicate which advertisements the targeted viewer might enjoy seeing.

In some embodiments, potentially positively correlated viewers may correspond to viewers belonging to the targeted viewer's social network. Thus, 226 may include, at 228, identifying a social network for the targeted viewer. It will be appreciated that a social network may be any suitable collection of people with a social link to the targeted viewer such that the targeted viewer's interests may be particularly correlated with the collective interest of the network members. Such a network may be user-defined or defined automatically by a common characteristic between users (e.g., alumni relationships). Additionally or alternatively, in some embodiments, potentially positively correlated viewers may correspond to viewers belonging to a demographic group to which the targeted viewer belongs. It will be appreciated that a demographic group may be defined based upon any suitable characteristics that may lead to more highly correlated interests between group members than between all users.

At 230, method 200 includes filtering the aggregated emotional response profiles for the plurality of advertisements to locate those received from the group of potentially positively correlated viewers. Filtering the aggregated emotional response profiles based on the targeted viewer's social network may help to select advertisements for goods and services previously found interesting by the targeted viewer's close social connections and/or other demographically similar users, and therefore that may be interesting to the targeted viewer as well.

At 232, method 200 includes selecting a particular advertisement for presentation from the plurality of advertisements based on the filtered aggregated emotional response profiles. For example, advertising selection decisions may be made based on a magnitude of an emotional response of the group of potentially positively correlated viewers to the advertisement as a whole using the filtered aggregated emotional response profile for that advertisement. If the emotional response magnitude exceeds a preselected threshold, the advertisement may be selected for display to the targeted viewer.

Additionally or alternatively, such advertisement selection decisions may also be made based on aspects of such advertisements (e.g., themes, products, locations, concepts, etc.) that are associated with relatively higher magnitudes of emotional responses. For example, if the aggregated emotional response profiles for a group of viewers show a relatively higher emotional response for advertisements depicting intense outdoor recreation, then similar advertisements for other products may be selected for future display to the targeted viewer.

As mentioned above, in some embodiments, advertising selection decisions may be based in part on the targeted viewer's current emotional status. Thus, 232 may include, at 234, selecting a particular advertisement for presentation based on a correlation of the emotional status of the targeted viewer and the filtered aggregated emotional response profiles. For example, if the targeted viewer's attention is wandering, an advertisement for a product that the targeted viewer is likely to be interested in, as judged from the targeted viewer's advertisement interests, social network, and/or demographic group may be selected. Alternatively, if the targeted viewer's attention is already engaged, a comparatively more subtle and/or nuanced advertisement may be selected. In another example, if the sensor data indicates that the targeted viewer is anxious, a soothing advertisement may be selected in the hope of reaching out to a potential wish of the targeted viewer to be comforted. The targeted viewer's emotional status may be determined in any suitable way, including but not limited to the semantic mining schemes mentioned above.

In some embodiments, information about the targeted viewer's emotional status and the filtered, aggregated emotional response profiles may be used to select a particular advertisement from a series of advertisements in an advertising campaign for a particular brand. For example, decisions about whether the targeted viewer is ready to be presented with an advertisement from a different stage of the advertising campaign may be made based on the relative progress of a targeted viewer and a group of other viewers socially connected with the targeted viewer through the campaign, as well as and a relationship between the targeted viewer's emotional response to the campaign and the responses of the group of other viewers. Consequently, the campaign may be personalized to the targeted viewer's impression frequency and emotional response level. For example, an impression frequency and/or advertisement selection may be modified if it is determined that the targeted viewer's interest is waning.

Such campaigns may be managed by tracking various aspects of advertisement delivery to the targeted viewer over time and by basing selection of the particular advertisement on one or more of those tracked aspects. For example, in some embodiments, a frequency at which the targeted viewer is presented with and/or views one or more advertisements may be tracked over time. Tracking advertisement exposure and, in some cases, a portion of advertising impressions to which the targeted viewer pays attention or is detectably engaged (e.g., by the targeted viewer's emotional expression, by click-through responses, etc.) may provide desired information to advertisers and content providers.

Thus, process 232 may include, at 236, selecting the particular advertisement so that a respective targeted viewer frequency for the particular advertisement matches a preselected viewing frequency for the particular advertisement. The preselected viewing frequency may be any suitable frequency at which the advertisement is to be displayed. It will be appreciated that the preselected viewing frequency may vary over the course of an advertising campaign, and may be modified based upon one or more factors (e.g., position within an advertising campaign, time of day, viewing channel, type and/or identity of video content with which the advertisement is delivered, etc.).

Additionally or alternatively, in some embodiments, a context in which the targeted viewer views advertisements may be tracked over time. A "targeted viewer context" describes the circumstances in which an advertisement is shown to the targeted viewer. Non-limiting examples of targeted viewer contexts include a video content identity identifying a video content item with which the advertisement is presented, an ad break slot in which the advertisement appears within the video content, and an ad position in which the advertisement appears within the ad break slot. In some of such embodiments, 232 may include, at 238, selecting the particular advertisement based on the targeted viewer context.

It will be appreciated that further personalization may be realized by using viewer-provided filters, such as search terms and/or interests provided by the targeted viewer. For example, in some embodiments, selection of the advertisement may also be based on the targeted viewer's advertisement interest profile (e.g., advertisement interest profile 308 shown in FIG. 3). Further, emotional responses to non-advertising video content may be tracked to determine viewer interests.

It will be appreciated that, just as an advertising campaign including several advertisements related to an overall brand concept may be managed by selecting particular advertisements in view of the targeted viewer's emotional status, individual advertisements may be similarly customized to the targeted viewer. For example, a first portion of an advertisement may be provided to the targeted viewer and the emotional response of the targeted viewer may be monitored. In response, one of a plurality of second portions of that advertisement may be selected to be presented to the targeted viewer based on the emotional response to the first portion. Thus, if the targeted viewer's emotional expression was judged favorable to a dramatic mountain vista shown in an opening scene of the first portion advertisement, a second portion including additional rugged mountain scenery may be selected instead of an alternative second portion that includes a dynamic office environment. Thus, in some embodiments, 232 may include, at 244, selecting a first portion of the particular advertisement to be sent to the targeted viewer.

Once the particular advertisement (or portion thereof) has been selected, method 200 includes, at 246, sending the advertisement to be output for display (as shown at 248) to the targeted viewer (e.g. on a primary display or on a companion device display).

Turning to FIG. 2C, method 200 includes, at 250, collecting sensor data of the targeted viewer's emotional response to the particular advertisement from a video viewing environment sensor, and at 252, sending the sensor data to a media computing device, where it is received. It will be appreciated that collecting the targeted viewer's emotional response to the particular advertisement may be performed in any suitable way, including but not limited to the collection schemes mentioned above.

At 254, method 200 includes generating an emotional response profile for the targeted viewer for the particular advertisement. If the targeted viewer already has an emotional response profile for the particular advertisement (for example, because the targeted viewer has seen the advertisement before), the existing profile may be written over or saved as a new instance (e.g. with new context data that is different than the prior context data). It will be appreciated that generation of the emotional response profile may be performed in any suitable way, including the semantic mining approaches described above. At 256, method 200 includes sending the emotional response profile to the server computing device for further processing.

The targeted viewer's emotional response to the particular advertisement may be used to adjust selection criteria for future advertisement selection. Thus, at 258, method 200 includes updating the aggregated emotional response profile with the targeted viewer's emotional response to the particular advertisement. Updating the aggregated emotional response profile for the advertisement with the targeted viewer's emotional response profile for that particular advertisement may help to keep advertising selection in line with a viewer's current interests.

Another way in which selection criteria may be adjusted includes altering the membership of the group of potentially positively correlated viewers. For example, differences between the targeted viewer's emotional response and the aggregated emotional response profile for the particular advertisement as filtered by the potentially positively correlated viewers (by more than an acceptable tolerance) may indicate that refining the membership of the group of potentially positively correlated viewers may comparatively enhance the customization of advertisement selection for the targeted viewer.

Thus, at 260, method 200 includes updating the constituency of the group of potentially positively correlated viewers based on a degree of correlation of the targeted viewer's emotional response to the particular advertisement with the emotional response profiles in the group's aggregated emotional response profile. In some embodiments, new members with different, yet related, advertising interest profiles may be added to introduce variation to the group of potentially positively correlated viewers. Additionally or alternatively, in some embodiments, existing members may be retired from the group where the targeted viewer's advertising interest profile has drifted apart from those members.

The targeted viewer's emotional response to the particular advertisement, alone or in combination with one or more of the example selection criteria modifications mentioned above, may be used to provide additional advertising content to the targeted viewer.

As one example, in an embodiment where the targeted viewer's emotional response to a first portion of the particular advertisement is used, during display of the advertisement, to select a second portion of the advertisement, method 200 may include, at 262, selecting a second portion of the particular advertisement based on the targeted viewer's emotional response to the first portion of the particular advertisement, and, at 264, sending the second portion of the particular advertisement to another computing device to be output for display to the targeted viewer. At 266 of such embodiments, method 200 includes outputting the second portion of the particular advertisement for display.

As another example of how the targeted viewer's emotional response to the particular advertisement may be used to provide additional advertising content, in some embodiments, method 200 may include, at 268, selecting a related advertisement to send to the targeted viewer, sending the related advertisement to another computing device at 270, and, at 272, outputting the related advertisement for display to the targeted viewer. Any advertisement suitably related to the particular advertisement may be provided as the related advertisement. Suitable relationships include, but are not limited to, contextual relationships among the advertisements, such as advertising campaign and/or concept relationships, brand relationships, geographic relationships, and goods and services relationships.

In some embodiments, the related advertisement may include content supplementary to the particular advertisement. For example, the related advertisement may be sent to a mobile computing device belonging to the targeted viewer for display concurrently with the display of the particular advertisement on a primary display. In this example, the related advertisement may include interactive user interface control elements operable by the targeted viewer to enable, for example, an advertisement-related entertainment and/or purchasing experience on the mobile computing device.

As engagement with such experiences may correlate with a high degree of engagement with a brand and/or advertising campaign, method 200 may include, at 274, sending a clickthrough response to a related advertisement to the server computing device, and, at 276, tracking the clickthrough response to the related advertisement. In turn, the targeted viewer's clickthrough response may be used to help customize advertisement selections for the targeted viewer in the future. For example, the targeted viewer's advertisement interest profile 308 may be updated according to clickthrough responses provided by the targeted viewer to the related advertisement.

As introduced above, in some embodiments, the methods and processes described in this disclosure may be tied to a computing system including one or more computers. In particular, the methods and processes described herein may be implemented as a computer application, computer service, computer API, computer library, and/or other computer program product.

FIGS. 2A-B schematically show, in simplified form, a non-limiting computing system that may perform one or more of the above described methods and processes. It is to be understood that virtually any computer architecture may be used without departing from the scope of this disclosure. In different embodiments, the computing system may take the form of a mainframe computer, server computer, desktop computer, laptop computer, tablet computer, home entertainment computer, network computing device, mobile computing device, mobile communication device, gaming device, etc.

The computing system includes a logic subsystem (for example, logic subsystem 116 of mobile computing device 104 of FIG. 2A, logic subsystem 146 of mobile computing device 140 of FIG. 2B, and logic subsystem 136 of server computing device 130 of FIG. 2A) and a data-holding subsystem (for example, data-holding subsystem 114 of mobile computing device 104 of FIG. 2A, data-holding subsystem 144 of mobile computing device 140 of FIG. 2B, and data-holding subsystem 134 of server computing device 130 of FIG. 2A). The computing system may optionally include a display subsystem, communication subsystem, and/or other components not shown in FIG. 2A-B. The computing system may also optionally include user input devices such as keyboards, mice, game controllers, cameras, microphones, and/or touch screens, for example.

The logic subsystem may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

The data-holding subsystem may include one or more physical, non-transitory, devices configured to hold data and/or instructions executable by the logic subsystem to implement the herein described methods and processes. When such methods and processes are implemented, the state of the data-holding subsystem may be transformed (e.g., to hold different data).

The data-holding subsystem may include removable media and/or built-in devices. The data-holding subsystem may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem may include devices with one or more of the following characteristics: volatile, nonvolatile, dynamic, static, read/write, read-only, random access, sequential access, location addressable, file addressable, and content addressable. In some embodiments, the logic subsystem and the data-holding subsystem may be integrated into one or more common devices, such as an application specific integrated circuit or a system on a chip.

FIGS. 2A-B also show an aspect of the data-holding subsystem in the form of removable computer storage media (for example, removable computer storage media 118 of mobile computing device 104 of FIG. 2A, removable computer storage media 148 of mobile computing device 140 of FIG. 2B, and removable computer storage media 138 of server computing device 130 of FIG. 2A), which may be used to store and/or transfer data and/or instructions executable to implement the herein described methods and processes. Removable computer storage media may take the form of CDs, DVDs, HD-DVDs, Blu-Ray Discs, EEPROMs, and/or floppy disks, among others.

It is to be appreciated that the data-holding subsystem includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of the computing system that is implemented to perform one or more particular functions. In some cases, such a module, program, or engine may be instantiated via the logic subsystem executing instructions held by the data-holding subsystem. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, a display subsystem may be used to present a visual representation of data held by the data-holding subsystem. As the herein described methods and processes change the data held by the data-holding subsystem, and thus transform the state of the data-holding subsystem, the state of display subsystem may likewise be transformed to visually represent changes in the underlying data. The display subsystem may include one or more display devices utilizing virtually any type of technology. Such display devices may be combined with the logic subsystem and/or the data-holding subsystem in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of selecting an advertisement for display to a targeted viewer, the method comprising:
    for each of a plurality of advertisements, aggregating a plurality of emotional response profiles from a corresponding plurality of prior viewers of the advertisement to form an aggregated emotional response profile for the advertisement, each of the emotional response profiles comprising a temporal record of a prior viewer's emotional response to the advertisement when viewed by the prior viewer, and one or more advertisements of the plurality of advertisements comprising at least a first portion and a plurality of possible second portions;
    sending a first portion of a particular advertisement for display to the targeted viewer of the particular advertisement;
    receiving input of the targeted viewer's emotional response to the first portion of the particular advertisement;
    selecting a second portion of the particular advertisement from the plurality of possible second portions for the particular advertisement based on a correlation of the targeted viewer's emotional response to the first portion of the particular advertisement to the aggregated emotional response profiles; and
    sending the second portion of the particular advertisement to be output for display to the targeted viewer.

2. The method of claim 1, further comprising tracking targeted viewer frequencies at which the targeted viewer views the plurality of advertisements, wherein selecting the particular advertisement includes selecting the particular advertisement so that the respective targeted viewer frequency for the particular advertisement matches a preselected viewing frequency for the particular advertisement.

3. The method of claim 1, further comprising:
    tracking targeted viewer contexts during which the targeted viewer views the plurality of advertisements; and
    wherein selecting the particular advertisement includes selecting the particular advertisement based on one or more of a video content identity identifying a video content item with which the particular advertisement is to be presented, an ad break slot in which the particular advertisement is to appear within the video content, and an ad position in which the particular advertisement is to appear within the ad break slot.

4. The method of claim 1, further comprising:
    determining a current emotional status of the targeted viewer by detecting emotional reactions of the targeted viewer while the targeted viewer is not viewing a display as determined by image data capturing the targeted viewer;
    selecting a second advertisement from the plurality of advertisements based on the determined current emotional status of the targeted viewer; and
    sending the second advertisement for display to the targeted viewer.

5. The method of claim 1, further comprising:
    receiving input of the targeted viewer's emotional response to the particular advertisement; and
    updating the aggregated emotional response profile for the particular advertisement with the targeted viewer's emotional response to the particular advertisement.

6. The method of claim 1, further comprising:
    determining an attentiveness of the targeted viewer to the particular advertisement based on an emotional response of the targeted viewer to the particular advertisement; and determining a payout value based on the attentiveness to be paid from one entity within a video content delivery chain to another entity within the video content delivery chain.

7. The method of claim 1, further comprising:
identifying a group of potentially positively correlated viewers for the targeted viewer based upon a social network to which the targeted viewer belongs; and
filtering the aggregated emotional response profiles for the plurality of advertisements based on the group of potentially positively correlated viewers.

8. The method of claim 7, further comprising:
receiving input capturing the targeted viewer's emotional response to the particular advertisement; and
updating a constituency of the group of potentially positively correlated viewers according to a correlation of the targeted viewer's emotional response to the particular advertisement and the aggregated emotional response profile.

9. On a computing device, a method of displaying one of a plurality of advertisements to a targeted viewer, the method comprising:
determining a targeted viewer's current emotional status from emotional feedback data received from a video viewing environment sensor monitoring the targeted viewer;
sending, to a server, the targeted viewer's current emotional status;
receiving a particular advertisement for display to the targeted viewer, the particular advertisement selected from among the plurality of advertisements based on the targeted viewer's current emotional status and an aggregated emotional response profile formed by aggregating a plurality of emotional response profiles comprising a temporal record of prior viewers' emotional responses to the particular advertisement, the prior viewers having a social link to the targeted viewer;
outputting the particular advertisement for display to the targeted viewer; and
sending the targeted viewer's emotional response to the particular advertisement from the video viewing environment sensor to the server.

10. The method of claim 9, further comprising identifying the targeted viewer based on image data received from the video viewing environment sensor.

11. The method of claim 10, further comprising identifying the targeted viewer based on a facial similarity comparison between a face included in image data collected from the video viewing environment sensor and an image stored in a viewer profile for the targeted viewer.

12. The method of claim 9, wherein selecting the particular advertisement includes selecting the particular advertisement so that a respective targeted viewer frequency for the particular advertisement matches a preselected viewing frequency for the particular advertisement.

13. The method of claim 9, wherein selecting the particular advertisement includes selecting the particular advertisement based on one or more of a video content identity identifying a video content item with which the advertisement was presented, an ad break slot in which the advertisement appeared within the video content, and an ad position in which the advertisement appeared within the ad break slot.

14. The method of claim 9, further comprising:
determining the current emotional status of the targeted viewer by measuring emotional reactions of the targeted viewer while the targeted viewer is not viewing a display as determined by image data capturing the targeted viewer;
selecting a second advertisement from the plurality of advertisements based on the determined current emotional status of the targeted viewer; and
sending the second advertisement for display to the targeted viewer.

15. A server system for delivering selected advertisements to a targeted viewer, the system comprising:
a logic subsystem; and
a data-holding subsystem holding instructions executable by the logic subsystem to:
for each of a plurality of advertisements of an advertising campaign comprising a pre-determined progression of advertisements for a particular brand, aggregate a plurality of emotional response profiles from a corresponding plurality of prior viewers of the advertisement to form an aggregated emotional response profile for the advertisement, each of the emotional response profiles comprising a temporal record of a prior viewer's emotional response to the advertisement when viewed by the prior viewer,
receive an emotional status of the targeted viewer,
select a first advertisement for presentation from the plurality of advertisements of the advertising campaign based on a correlation of the emotional status of the targeted viewer, filtered aggregated emotional response profiles, and the pre-determined progression of the advertising campaign,
send the first advertisement for display to the targeted viewer,
receive the targeted viewer's emotional response to the first advertisement, and
select a second advertisement of the advertising campaign based on the targeted viewer's emotional response to the first advertisement and the pre-determined progression of the advertising campaign; and
send the second advertisement for display to the targeted viewer.

16. The system of claim 15, wherein the instructions executable to select the first advertisement for presentation further comprise instructions executable to select the first advertisement based on an advertisement interest profile of the targeted viewer.

17. The system of claim 15, further comprising instructions executable to:
send, based on the targeted viewer's emotional response to the first advertisement from a primary display, a related advertisement to a mobile computing device belonging to the targeted viewer; and
track a clickthrough response of the targeted viewer to the related advertisement.

18. The system of claim 15, further comprising instructions executable to track targeted viewer frequencies at which the targeted viewer views the plurality of advertisements, and wherein the first advertisement is further selected so that the respective targeted viewer frequency for the first advertisement matches a preselected viewing frequency for the first advertisement.

19. The system of claim 15, further comprising instructions executable to track targeted viewer contexts during which the targeted viewer views the plurality of advertisements, and wherein the first advertisement is further selected based on one or more of a video content identity identifying a video content item with which the first advertisement is to be presented, an ad break slot in which the first advertisement is to appear within the video content item, and an ad position in which the first advertisement is to appear within the ad break slot.

* * * * *